US009314078B1

(12) United States Patent
Haymond et al.

(10) Patent No.: US 9,314,078 B1
(45) Date of Patent: Apr. 19, 2016

(54) UNIVERSAL COMPATIBLE PHONE OR TABLET CASE USING STRETCHABLE POLYMER

(71) Applicant: American Covers, Inc., Draper, UT (US)

(72) Inventors: Bryce Haymond, West Valley City, UT (US); Jason Fogg, Lake Point, UT (US)

(73) Assignee: American Covers, Inc., Draper, UT (US)

( * ) Notice: Subject to any disclaimer, the term of this patent is extended or adjusted under 35 U.S.C. 154(b) by 0 days.

(21) Appl. No.: 14/543,713

(22) Filed: Nov. 17, 2014

(51) Int. Cl.
*A45F 5/00* (2006.01)
*A45C 11/00* (2006.01)

(52) U.S. Cl.
CPC . *A45C 11/00* (2013.01); *A45F 5/00* (2013.01); *A45C 2011/002* (2013.01); *A45C 2011/003* (2013.01); *A45F 2005/008* (2013.01)

(58) Field of Classification Search
CPC ............... A45F 2005/008; A45F 2200/0516; A45F 2200/0525; A45C 2011/002; A45C 2011/003; A45C 2011/001; A45C 13/002; H04B 2001/3861
USPC .......................................... 224/217, 280, 930
See application file for complete search history.

(56) References Cited

U.S. PATENT DOCUMENTS

| 5,064,924 A * | 11/1991 | Shimizu | C08J 3/241 528/15 |
| 6,412,674 B1 * | 7/2002 | Lipke | A45C 7/00 224/235 |
| 6,616,111 B1 * | 9/2003 | White | G06F 1/1626 206/320 |
| 6,752,299 B2 * | 6/2004 | Shetler | A45F 5/02 224/197 |
| D582,675 S | 12/2008 | Nelson | |
| D592,400 S | 5/2009 | Nelson | |
| 8,016,107 B2 * | 9/2011 | Emsky | A45C 11/00 206/320 |
| D671,932 S * | 12/2012 | Azoulay | D14/250 |
| D673,162 S | 12/2012 | Young | |
| D675,828 S | 2/2013 | Baker | |
| 8,544,644 B2 * | 10/2013 | Meehan | G06F 1/1628 206/320 |
| D693,580 S | 11/2013 | Baker | |
| 9,060,588 B2 * | 6/2015 | Bransfield | A45F 5/02 |
| 2008/0202958 A1 | 8/2008 | Hanlen et al. | |
| 2009/0114557 A1 | 5/2009 | Nelson | |
| 2010/0230301 A1 * | 9/2010 | Fellig | H04M 1/04 206/232 |
| 2011/0248312 A1 * | 10/2011 | Katayama | C08L 83/04 257/100 |
| 2015/0001265 A1 * | 1/2015 | Hart | A45F 5/021 224/269 |

OTHER PUBLICATIONS

Flanagan et al.; "Stretchy Smart Phone Case;" Leather Crafters & Saddlers Journal; Mar./Apr. 2014, pp. 9-16.
(Continued)

*Primary Examiner* — Adam Waggenspack
(74) *Attorney, Agent, or Firm* — Thorpe, North & Western, LLP

(57) ABSTRACT

A universal case has a single, unitary, elastic body of flexible and resilient material that can stretch to cover both smaller and larger mobile devices. The body has a side wall, a front perimeter lip, a rear perimeter lip and a web defining a cavity and being integral with one another and formed together from the flexible and resilient material as the single, unitary, elastic body. The side wall, the front perimeter lip and the rear perimeter lip define a perimeter channel to extend around a perimeter of the mobile device. The front perimeter lip defines a cavity and has corner lips with a wider width to define corner pockets. A groove is disposed in the channel, and extends into an inner surface of the side wall.

21 Claims, 8 Drawing Sheets

(56) References Cited

OTHER PUBLICATIONS

Aqua skin universal underwater smartphone case; accessed Mar. 17, 2015; 3pages; https://www.socialshopper.com/deal.php?id=1930.
Convert plus case & holster combo; accessed Mar. 17, 2015; 2pages; http://www.seidioonline.com/apple-iphone-4-convert-plus-case-holster-black-p/bd4-hkr4iph4x-bk.htm.
Crossover; www.quirky.com ; iphone 5 silicone bands case; accessed Feb. 17, 2014.
Lightweight; www.padlette.com; accessed Mar. 18, 2014.
Ohgizmo; This 'Just a Loop' Cord is the Simplest iPhone Case You're Ever Going to Find; http://www.ohgizmo.com/2011/01/14/this-just-a-loop-elastic-cord-is-the-simplest-iphone-case-youre-ever-going-to-find/. Jan. 14, 2011.

* cited by examiner front top/bottom back back back back

UNIVERSAL COMPATIBLE PHONE OR TABLET CASE USING STRETCHABLE POLYMER

BACKGROUND

1. Field of the Invention

The present invention relates generally to cases for cellular phones or tablet computers.

2. Related Art

Cases have been developed to receive cellular phones or tablets therein to provide protection to the cellular phone or tablet, such as from dropping. Such cases are configured for a particular brand of cellular phone or tablet, or sized and shaped to receive only a corresponding sized and shaped cellular phones or tablets.

SUMMARY OF THE INVENTION

It has been recognized that it would be advantageous to develop a case for a cellular phone or tablet that is capable of receiving various different cellular phones or tablets having various different sizes.

The invention provides a universal case device configured for both a smaller mobile device and a larger mobile device. The case device comprises a single, unitary, elastic body of flexible and resilient material. The body has a side wall extending around a perimeter of the body. The body has a front perimeter lip extending from the side wall around a majority of the perimeter of the body at a front of the body. The front perimeter lip defines an aperture occupying a majority of the front of the body. The body has a rear perimeter lip extending from the side wall around a majority of a perimeter of the body at a rear of the body. The side wall, the front perimeter lip and the rear perimeter lip define a perimeter channel configured to extend around a perimeter of both the larger and the smaller mobile devices when disposed therein. A web has connections connected to the rear perimeter lip only adjacent corners of the body. The perimeter channel and the rear perimeter lip are free of the web along a majority thereof. The side wall, the front perimeter lip, the rear perimeter lip and the web are integral with one another and formed together from the flexible and resilient material as the single, unitary, elastic body. The side wall, the front perimeter lip, the rear perimeter lip and the web define a cavity to receive one of the mobile devices therein. The front perimeter lip has side and end lips at sides and ends, respectively, of the aperture. The front perimeter lip has corner lips at corners of the aperture. The side and end lips have a narrower width extending inwardly from a perimeter of the body over the cavity, and the corner lips have a wider width extending inwardly from the perimeter of the body over the cavity to define corner pockets. The body has at least two configurations, including: 1) a less stretched configuration in which the material of the body is less stretched and the body has a smaller width, height, or both, corresponding to the smaller mobile device and with the smaller mobile device disposed in the cavity; and 2) a more stretched configuration in which the material of the body is more stretched and the body has a larger width, height, or both, corresponding to the larger mobile device and with the larger mobile device disposed in the cavity.

In accordance with a more detailed aspect of the invention, the perimeter channel can have a pair of side channels on opposite sides of the body and facing inwardly to the cavity and receiving lateral sides of one of the mobile devices when disposed in the cavity. A pair of grooves can each be in a different one of the pair of side channels, with each groove extending into an inner surface of the side wall.

In accordance with a more detailed aspect of the invention, the body can have at least three configurations including: 1) a less stretched configuration in which the material of the body is less stretched and the body has a smaller width, height, or both, corresponding to the smaller mobile device and with the smaller mobile device disposed in the cavity; 2) a more stretched configuration in which the material of the body is more stretched and the body has a larger width, height, or both, corresponding to the larger mobile device and with the larger mobile device disposed in the cavity; and 3) an unstretched configuration in which the body is removed from both the larger and smaller mobile devices. The width, the height, or both of the body can stretch at least 107%.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
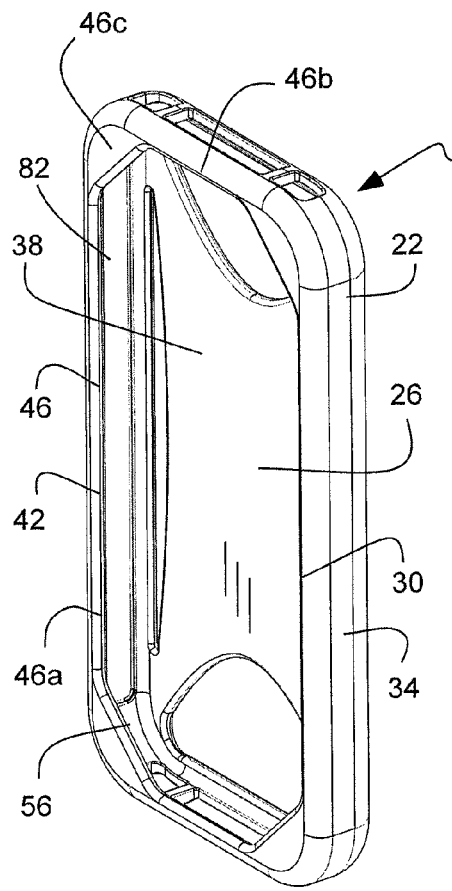
FIG. 1 is a front perspective view of a universal case in accordance with an embodiment of the present invention, shown without a cellular phone, and in an original, unstretched, and/or relaxed configuration, and having a smaller size.
Figure 2:
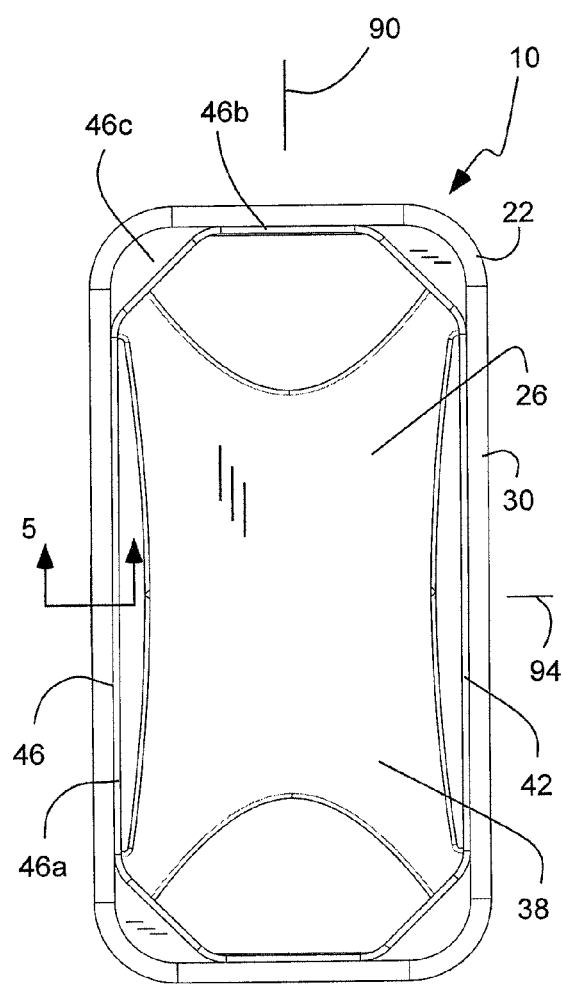
FIG. 2 is a front view of the universal case of FIG. 1.
Figure 3:
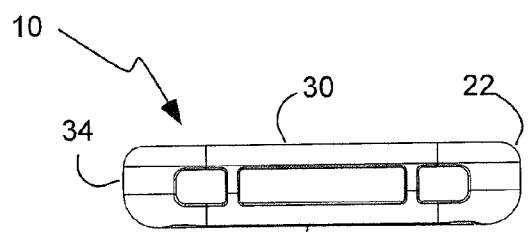
FIG. 3 is a top and bottom view of the universal case of FIG. 1.
Figure 4:
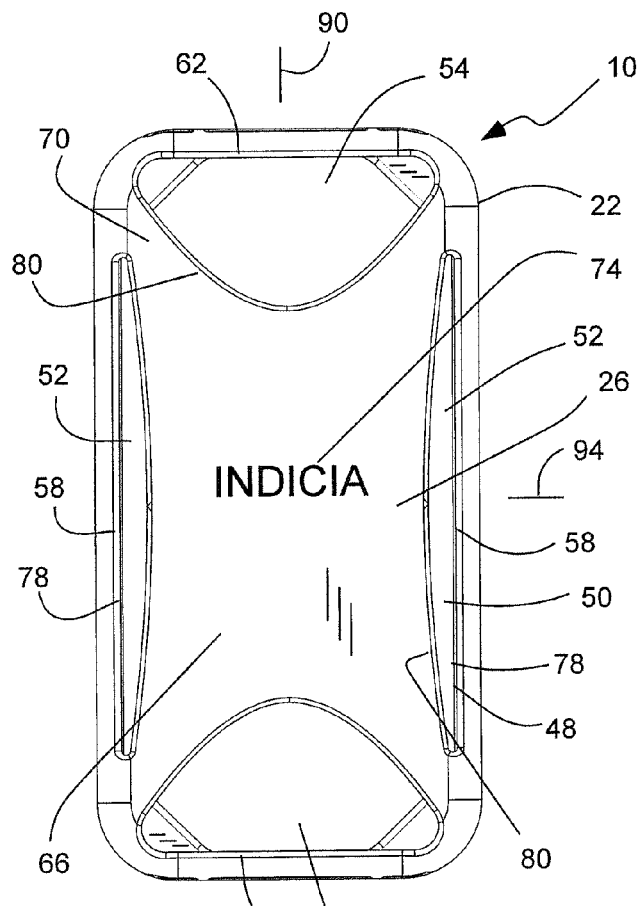
FIG. 4 is a back view of the universal case of FIG. 1.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

Definitions

The terms "business", "company" are used broadly and interchangeably herein to refer to an organization that provides a product or a service. The business, company or organization can have a name, logo, slogan, trademark, service mark, etc. that is capable of identifying and/or distinguishing the business or company, or product or service, or both, or can otherwise be utilized to market, promote, and/or brand the business or company, or product or service, or both. The universal case of the present invention can have indicia indicative of or representing a business, a product, or both. The indicia can include, for example, a name, logo, slogan, trademark, service mark, etc. Thus, the universal case can be utilized as a promotional device.

The term "mobile device" is used broadly herein to refer to a portable, hand-held electronic device, including by way of example, a cellular (cell) phone, a smart phone, a tablet computer or tablet, a global positioning system (GPS), a mobile media player, a gaming system, and the like. Such a device can have a display screen upon which data, information, media, etc. is viewed; one or more inputs, such as buttons, a touch screen, etc.; one or more outputs, such as the screen, a speaker, an audio jack, etc.; a power supply, such as a battery; a data storage system and a computing system. Such a device can also include a port or socket for receiving a power and/or data connection cord or plug. The mobile device can have a back or back surface, and a front or front surface. The display or touch screen can occupy a great majority of the front of the mobile device. Mobile devices can have various different sizes, including different widths, lengths, or both. The terms "smaller mobile device" and "larger mobile device" are used relative to one another. The smaller mobile device can have a smaller width, length (or height), or both, than the larger mobile device; and the larger mobile device can have a larger width, length (or height), or both, than the smaller mobile device. The width can extend laterally, side-to-side; while the height can extend longitudinally, up-and-down. The mobile device can be rectangular with a smaller width and a greater height.

The term "cellular phone" is used broadly herein to refer to a cellular phone, a cell phone, a smart phone, etc. Such cellular phones can be portable, handheld communication devices that can include a speaker, a microphone, a transmitter and a receiver (or transceiver), a power supply or battery, a display screen or touch screen display and input device, other input devices, such as one or more buttons, etc. The cellular phone can have a back or back surface, and a front or front surface. The display or touch screen can occupy a great majority of the front of the cellular phone. The term cellular phone is used broadly herein to refer to phablets. Cellular phones can have various different sizes, including different widths, lengths, or both. The terms "smaller cellular phone" and "larger cellular phone" are used relative to one another. The smaller cellular phone can have a smaller width, length (or height), or both, than the larger cellular phone; and the larger cellular phone can have a larger width, length (or height), or both, than the smaller cellular phone. The width can extend laterally, side-to-side; while the height can extend longitudinally, up-and-down. The cellular phone can be rectangular with a smaller width and a greater height. By way of example, a smaller cellular phone can have a width of approximately 58-71 mm, and a height of approximately 115-137 mm; while a larger cellular phone can have a width or approximately 71-78 mm, and a height of approximately 137-159 mm. As another example, the popular iPhone 5 (smaller cellular phone) has a width of 58.6 mm and a height of 123.8 mm; while the popular iPhone 6plus (larger cellular phone) has a width of 77.8 mm and a height of 158.1 mm. As another example, the popular iPhone 4 or 4s (smaller cellular phone) has a width of 58.6 mm and a height of 115.2 mm; while the popular iPhone 5 (larger cellular phone) has a width of 58.6 mm and a height of 123.8 mm.

The terms "tablet computer" and "tablet" are used interchangeably herein to refer to a computer or multi-media device that is one-piece with a screen and that is portable and handheld. Examples of tablets include the Apple™ iPad™, the Samsung™ Galaxy™ Tab™, etc. The screen can be a touch screen that can receive input by touch, such as finger swipes, and/or can have a virtual keyboard. The tablet can be wide (or broad) and thin. For example, the screen can have a diagonal length greater than 7 inches, and a thickness less than a ¼-½ inch. The tablet can have a battery and memory and a processor with software running thereon. The tablet can have WiFi and Bluetooth connectivity. Thus, the tablet can provide internet browsing, game playing, movie and picture display, e-book display, etc. In addition, the tablet can include a digital camera. Furthermore, the terms tablet computer and tablet are used broadly herein to refer to phablets, which also provide similar computing capabilities, battery power, memory, processor, software, WiFi and Bluetooth connectivity, touch screen display, digital camera, etc.

Description

Figure 5:
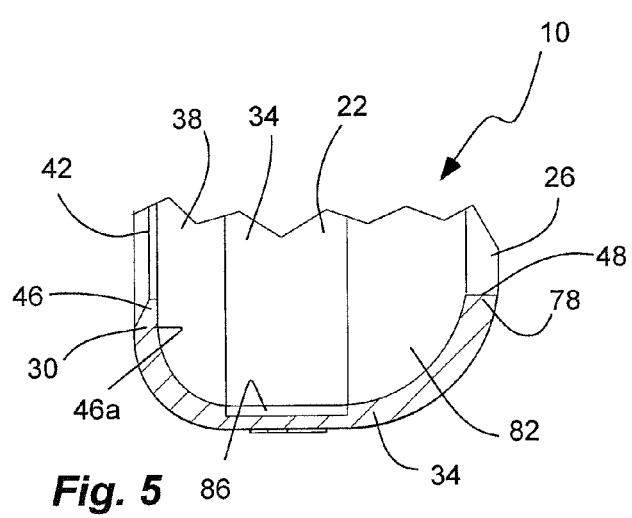
FIG. 5 is a detailed cross-sectional view of the universal case of FIG. 1, taken along line 5 of FIG. 2.
Figure 6:
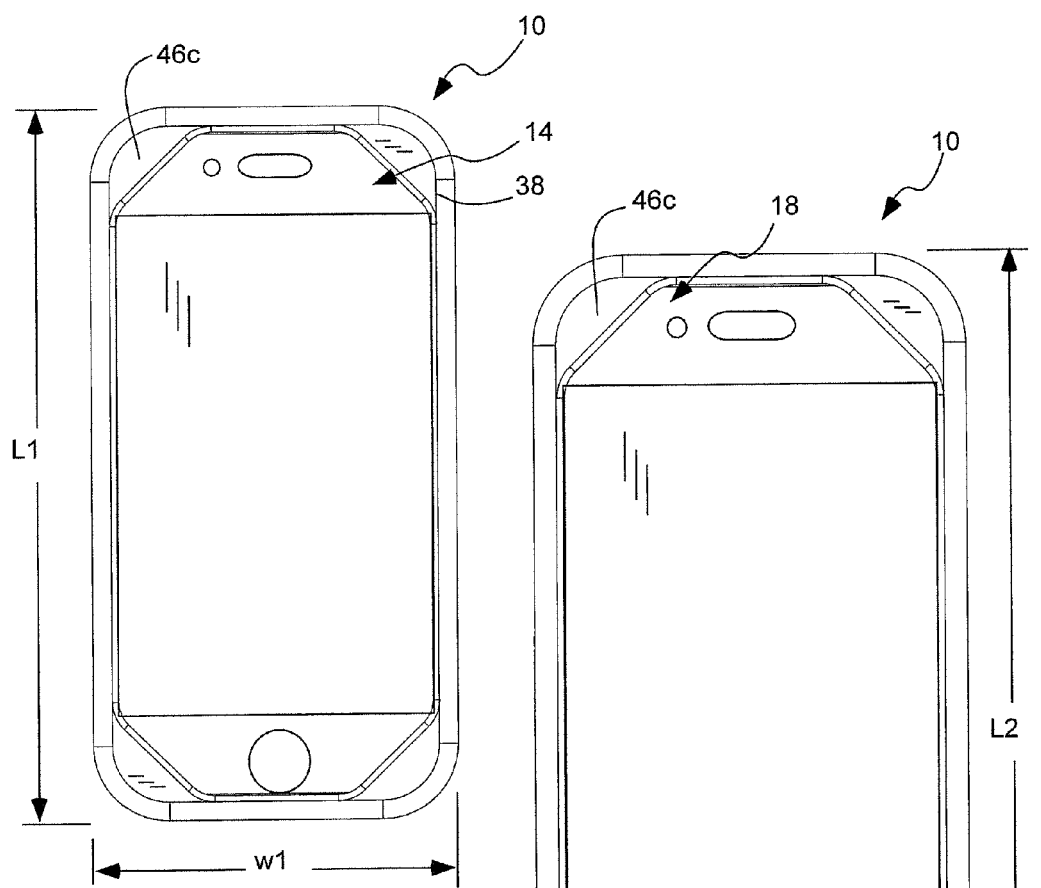
FIG. 6 is a front view of the universal case of FIG. 1, shown in a less stretched configuration with a smaller cellular phone therein, and having an intermediate size.
Figure 7:
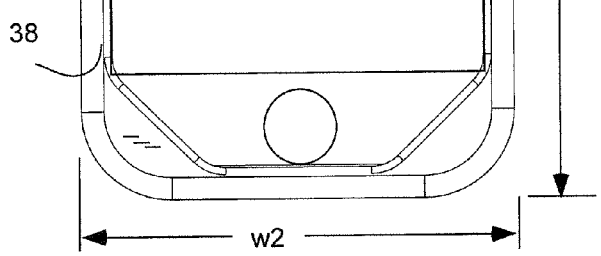
FIG. 7 is a front view of the universal case of FIG. 1, shown in a more stretched configuration with a larger cellular phone therein, and having a larger size.
Figure 8:
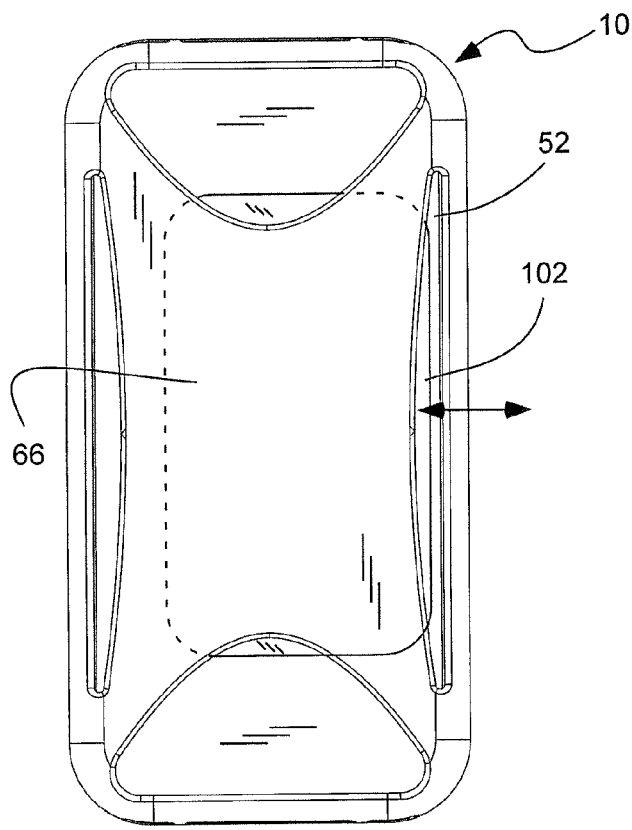
FIG. 8 is a back view of the universal case of FIG. 1, shown with a cellular phone therein, and an item held between the cellular phone and the universal case.
Figure 9:
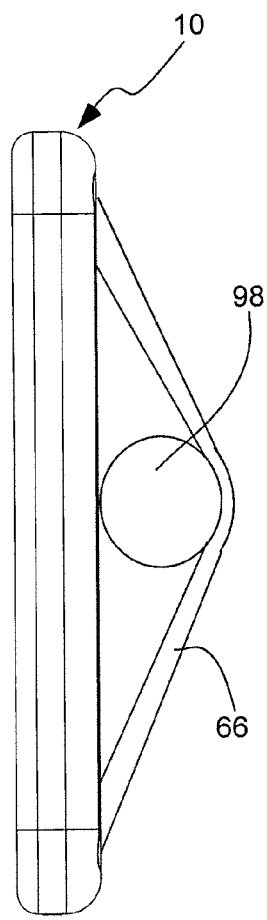
FIG. 9 is a side view of the universal case of FIG. 1, shown with a user's finger inserted between the cellular phone and the universal case.

As illustrated in FIGS. 1-9, a universal case, indicated generally at 10, in an example implementation in accordance with the invention is shown for smaller cellular phones 14 (FIG. 6) and larger cellular phones 18 (FIG. 7). The universal case 10 can be stretchable to cover cellular phones of different sizes. Thus, a single case can be provided to many different users with different cellular phones. A larger cellular phone or a smaller cellular phone can be selectively coupled to or received with the case. In one aspect, a length, a width, or both, of the case can stretch at least 107%. In another aspect, a length, a width, or both, of the case can stretch 125-135%. The universal case can be provided with indicia indicative of a product and/or business so that the case can be utilized as a promotional device. In addition, the case can provide a pocket or frictional strap to secure other items (e.g. a card, currency, or an identification or license card) between the cellular phone and the case. Furthermore, the case can provide a finger strap to receive a user's finger between the case (or strap) and the cellular phone to provide for more secure handling.

The case 10 can have a single, unitary, elastic body 22 of flexible and resilient material. In one aspect, the body can be formed of, or can comprise, silicone. The body can be a single piece of material molded at the same time and from the same material. The body 22 can have a side wall 34 extending around a perimeter of the body. In addition, the body 22 can have a front perimeter lip 46 extending from the side wall 34 around a majority of the perimeter of the body at a front of the body. The front perimeter lip 46 can define an aperture 42 occupying a majority of the front of the body. Furthermore, the body 22 can have a rear perimeter lip 48 extending from the side wall 34 around a majority of a perimeter of the body at a rear of the body. The side wall 34, the front perimeter lip 46 and the rear perimeter lip 48 can define a perimeter channel 82 extending around a perimeter of both the larger and the smaller cellular phones when disposed therein. The body 22 can also include a web 66 with connections 70 connected to the rear perimeter lip 48 only adjacent corners of the body. The perimeter channel 82 and the rear perimeter lip 48 can be free of the web along a majority thereof. Thus, when the body is stretched, a majority of the stretching occurs within the channel and/or side wall, and the connection. The web 6 can have a substantial X-shape with a center that is wider or broader, with more surface area, and appendages that are narrower. The side wall 34, the front perimeter lip 46, the rear perimeter lip 48 and the web 66 can be integral with one another, and formed together from the flexible and resilient material as the single, unitary, elastic body 22. Having the body or case as a single piece of material can resist splitting or separating of the different walls or sections as the body is stretched. In addition, the side wall 34, the front perimeter lip 46, the rear perimeter lip 48 and the web 66 can define a cavity 38 to receive one of the cellular phones therein.

The front perimeter lip 46 can have side and end lips 46a and 46b along sides and ends of the body and/or aperture, respectively. In addition, the front perimeter lip 46 can have corner lips 46c or gussets at corners of the aperture. The side and end lips 46a and 46b can have a narrower width extending inwardly from a perimeter of the body over the cavity. And the corner lips 46c can have a wider width extending inwardly from the perimeter of the body over the cavity. Thus, the corner lips 46c, and corners of the wide wall 34, can define corner pockets 56 (FIG. 1) in the corners of the body, cavity, and/or channel. The web 66 can interact with the corner pockets 56 to pull the pockets back when the body is stretched over the cellular phone. The wider corner lips 46c can help maintain the channel on the cellular phone when the body is stretched over the cellular phone and the web pulls back.

In one aspect, the body can have a back wall 26 and a front wall 30, and the side wall 34 can be an intermediate side wall extending around a perimeter of the front and the back walls 30 and 26, and interconnecting the front and the back walls 30 and 26. The front wall 30, the back wall 26 and the intermediate side wall 34 can define the cavity 38 to selectively receive one of the cellular phones therein. The front wall 30, the back 26 wall and the intermediate side wall 34 can be integral with one another, and can be formed together from the flexible and resilient material, as the single, unitary, elastic body 22. Having the body or case as a single piece of material can resist splitting or separating of the different walls or sections as the body is stretched.

In one aspect, the front wall 30 can have the aperture 42 formed therein, and occupying a majority of a front of the body. Thus, a majority of the front wall 30 can be open to expose a display of the one of the cellular phones in the cavity. In addition, the front wall 30 can have the front perimeter lip 46 extending around a majority of a perimeter of the body 22, and extending over the cavity 38. In one aspect, the lip 46 can extend around a majority of a perimeter of the cavity 38 or the aperture 42. In another aspect, the lip 46 can extend around an entire perimeter of the cavity 38 or the aperture 42 (as shown). Thus, the front wall can extend forward of the cellular phone around the entire perimeter of the cellular phone to provide protection.

As described above, the front perimeter lip 46 can have side lips or portions 46a at opposite sides of the aperture 42 in the front wall 30, and end lips or portions 46b at opposite ends of the aperture in the front wall. In addition, the perimeter lip 46 can have corner lips or portions 46c or gussets at corners of the aperture 42 in the front wall 30. The corner lips 46c can have a wider width extending inwardly from the perimeter of the body 22 over the cavity 38, while the side and end lips 46a and 46b can have a narrower width extending inwardly from the perimeter of the body over the cavity. In one aspect, the corner lips 46c at corners of the aperture 42 can form a chamfer with adjacent side and end lips 46a and 46b. In another aspect, the corner lips at the corners of the aperture can form a fillet. Thus, the corners of the cavity 38 can have deeper pockets to receive the corners of the cellular phone, while the sides and ends of the cavity can be shallower to expose the screen, the speaker, the microphone, and/or the inputs of the cellular phone.

In one aspect, a majority of the intermediate side wall 34 can be solid, and can cover a majority of a surface area of a perimeter of the body 22, and thus a majority of the perimeter sides of the cellular phone. Thus, the case can provide protection to the cellular phone. The intermediate side wall 34 can have one or more holes therein to accommodate electrical connection and/or input buttons for headphone connection, microphone connection, speaker sound output, battery charging connections, etc. Thus, the side wall does not block ports or connections, or speakers. The side wall can be pliable to allow engagement of buttons through the side wall. In one aspect, the side portions or sides of the side wall 34 can be solid. In one aspect, top and bottom ends of the side wall 34 can have holes therein to accommodate electrical connection and/or input buttons. In one aspect, a hole in the end can be a series or array of holes segmented or separated by ribs transversing the slot or separating the holes, and transversing or extending between the front and back walls, or the front and back lips. The ribs can keep the side walls intact to resist catching on other objects, and can add structure to the ends of the side walls side walls.

In one aspect, a majority of the back wall 26 can be solid, and can cover a majority of a surface area of a back of the body 22, and thus the back of the cellular phone. Thus, the case can provide protection to the cellular phone. The back wall 26 can have a plurality of slots 50 formed in the back wall. The plurality of slots 50 can include: a pair of side slots 52, and a pair of end slots 54. Each of the pair of side slots 52 can be located adjacent a different side of the back wall 26, and each can have an edge 58 extending along a majority of a respective side. Each of the pair of end slots 54 can be located adjacent a different end of the back wall 22, and each can have an edge 62 extending along a majority of a respective end. The plurality of slots 50 (or 52 and 54) can define the web or strap 66 in the back wall 22 between the slots 50 (or 53 and 54) and the connections 70 between the slots connecting the web 66 to the back wall 22 adjacent corners of the back wall. The slots 50 (or 52 and 54), or the web 66 and connections 70, allow the perimeter of the body 22 or case to stretch to surround the cellular phone. The web can be wider and higher than the connections so that the connections stretch more than the web. Thus, indicia 74 on the web can be preserved. Furthermore, the back wall 26 can have the rear perimeter lip 48 extending over the cavity 38, similar to the front perimeter lip 46 of the front wall 30. The back wall can also have side lips or portions 78 and end lips similar to the side and end lips of the front wall. In addition, the pair of side slots 52 and the pair of end slots 54, and thus the web or strap 66 defined thereby, can each have an opposite concave arcuate side 80 opposite the edge 58 or 62 extending along the majority of the side or end, respectively. The arcuate side 80 can facilitate stretching without separation or splitting of the material. In addition, the narrower connections 70 of the web can be sized to allow for more stretchability in these areas, and so that the narrower connections 70 stretch further than wide sections of the web. Thus, when the case or body is stretched onto the cellular phone, the side wall 34 and the narrow connections 70 of the web or the back wall can provide most of the stretching. The center section of the back wall or web can stay mostly relaxed. Thus, the side wall and the narrower connection allow for the extreme stretching between the relaxed configuration and the more stretched and larger configuration. Furthermore, the slots 50 (or 52 and 54) can be sized and located to expose cellular phone features, such as camera lenses and/or sensors, flashes, microphones, etc. Thus, the slots can be sized and shaped to expose the top corners and top mid center of the cellular phone where such features are commonly located.

As described above, the body 22 can have the perimeter channel 82 (FIGS. 1 and 5). The perimeter channel 82 can be defined between the front perimeter lip 46 of the front wall 30, the rear perimeter lip 48 of the back wall 26, and the intermediate side wall 34 therebetween. The channel 82 faces inwardly to the cavity 38, and receives lateral sides and ends of one of the cellular phones disposed in the cavity. In addition, a groove 86 is disposed in the channel 82, or each side of the channel. In one aspect, the groove 86 can circumscribe the body or channel. In another aspect, the groove 86 can be in the sides of the channel. The groove 86 extends into an inner surface of the intermediate side wall 34, as shown in FIG. 5. The groove 86 can accommodate or extend over or around input buttons on the side of the cellular phone, so that such buttons are not inadvertently activated by the body or case.

The case and the body 22 can be symmetrical about longitudinal and lateral axes. Thus, lateral sides of the body 22 can be symmetrical about a longitudinal axis 90; and longitudinal ends of the body can be symmetrical about a lateral axis 94. Thus, the case can be easier to install.

Referring to FIGS. 6 and 7, the case or the body 22 can have at least two configuration including: a less stretched and smaller configuration, as shown in FIG. 6, and a more stretched and larger configuration, as shown in FIG. 7. In the less stretched configuration (FIG. 6), the material of the body 22 is less stretched, and the body 22 has a smaller width w1, height L1, or both, corresponding to the smaller cellular phone 14, and with the smaller cellular phone disposed in the cavity 38. In the more stretched configuration (FIG. 7), the material of the body 22 is more stretched, and the body 22 has a larger width w2, height L2, or both, corresponding to the larger cellular phone 18, and with the larger cellular phone disposed in the cavity 38. In addition, the case or the body 22 can have at least three configurations, including an original, unstretched, and/or relaxed configuration, along with the less stretched and smaller configuration, and the more stretched and larger configuration. The case or the body 22 can have a smaller size than in the less stretched and smaller configuration on the smaller cellular phone. In addition, the case or the body can be stretched in the less stretched and smaller configuration on the smaller cellular phone. Thus, the case or the body can have an intermediate size in the less stretched and smaller configuration, and a larger size in the more stretched and larger configuration. For example, the case or the body can be stretched 104% (with respect to the original, unstretched or relaxed configuration) in the less stretched and smaller configuration, and 107% in the more stretched and larger configuration.

As described above, the body can have a width, a length (or height), or both, that can stretch at least 125% in one aspect, or at least 135% in another aspect. Thus, the case or body can stretch to accommodate cellular phones of different sizes in the cavity. In addition, the case or body can stretch to change the size and/or shape of the cavity. The flexible and resilient material of the body 22 can be formed of, or can comprise, a polymer that is stretchable. As described above, the flexible and resilient material of the body 22 can be formed of, or can comprise, silicone. In one aspect, the silicone can be a silicone cured at a temperature of approximately 40 degrees Celsius to obtain the desired balance of form and stretchability. Curing the silicone at a temperature of approximately 40 degrees Celsius has been found to provide stretching of at least 107%. In another aspect, the silicone can be cured at a temperature of approximately 35-45 degrees Celsius to obtain the desired balance of form and stretchability. In another aspect, the silicone can be cured at a temperature of approximately 25-55 degrees Celsius to obtain the desired balance of form and stretchability. In another aspect, the silicone can be cured at a temperature of approximately 20-80 degrees Celsius to obtain the desired balance of form and stretchability. In addition, an exterior surface of the silicone or exterior surface finish can be treated with a soft touch finish chemical so that the exterior surface is smooth and slick. Thus, when the cover or body is assembled on the cellular phone, the exterior surface can slide easily into and out of clothing pockets without catching. Furthermore, an interior surface of the cavity of an interior surface finish of the silicone can be glossy and grippy so that the interior surface grips the exterior surface of the cellular phones tightly. Thus, the interior surface keeps the cover or body securely in place when stretched onto the cellular phone, and resists unintentionally slip or slide of the cover or body off of the cellular phone when in the stretched configurations.

As described above, the case or the body 22 can have indicia 74 disposed on an outward facing surface of the back wall 26. The indicia 74 can be indicative of or representing a business, a product, or both. Thus, the case can be utilized as a promotional device. The indicia can be printed.

The case can be used by:

removably inserting the smaller cellular phone 14 into the cavity 38 of the body 22 and stretching the perimeter lip 46 of the front wall 30 over a front of the smaller cellular phone;

removing the smaller cellular phone 14 from the cavity 38 of the body 22;

removably inserting the larger cellular phone 18 into the cavity 38 of the body 22 and stretching the perimeter lip 46 of the front wall 30 over a front wall of the larger cellular phone; and removing the larger cellular phone 18 from the cavity 38 of the body 22.

In addition, the case can be used by:

removably inserting one of the cellular phones 14 or 18 into the cavity 38 of the body 22; and removably inserting a finger 98 (FIG. 9), or another item 102 (FIG. 8) (e.g. a card, currency, or an identification or license card) through one of the pair of side slots 52 in the back wall 26, and between the web or strap 66 and a back of the one of the cellular phones.

Figure 10:
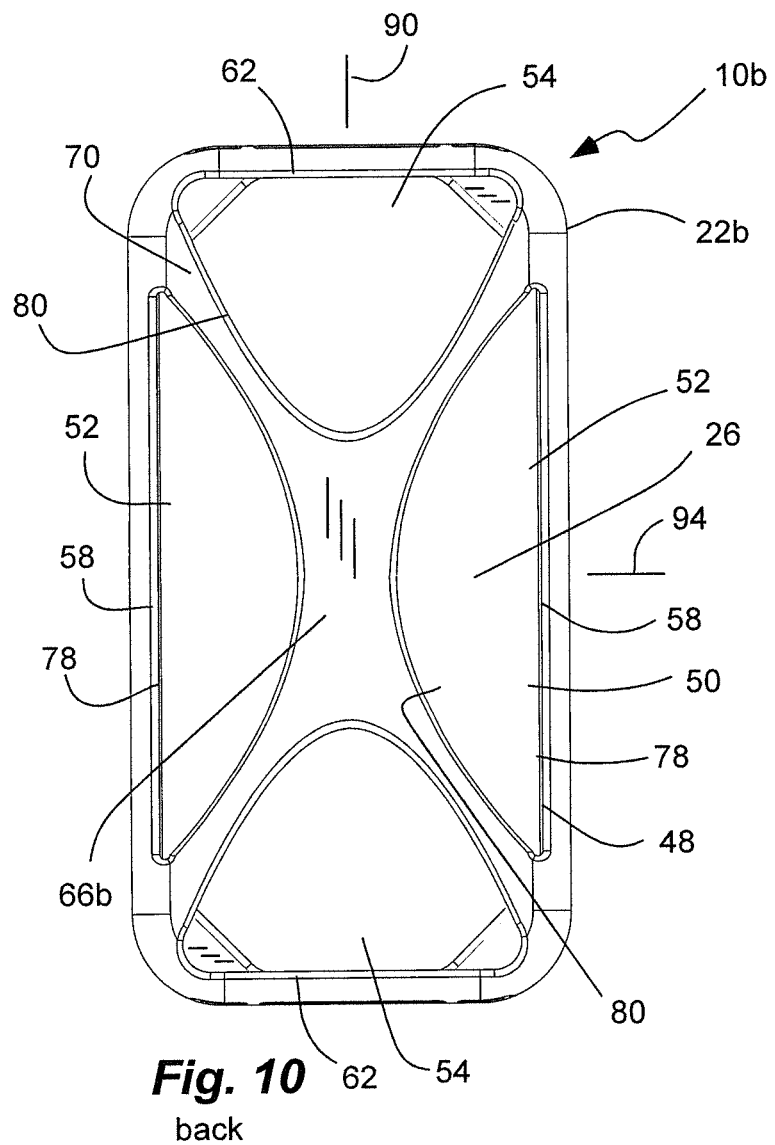
FIG. 10 is a back view of another universal case in accordance with an embodiment of the present invention, shown without a cellular phone, and in an original, unstretched, and/or relaxed configuration, and having a smaller size.
Figure 11:
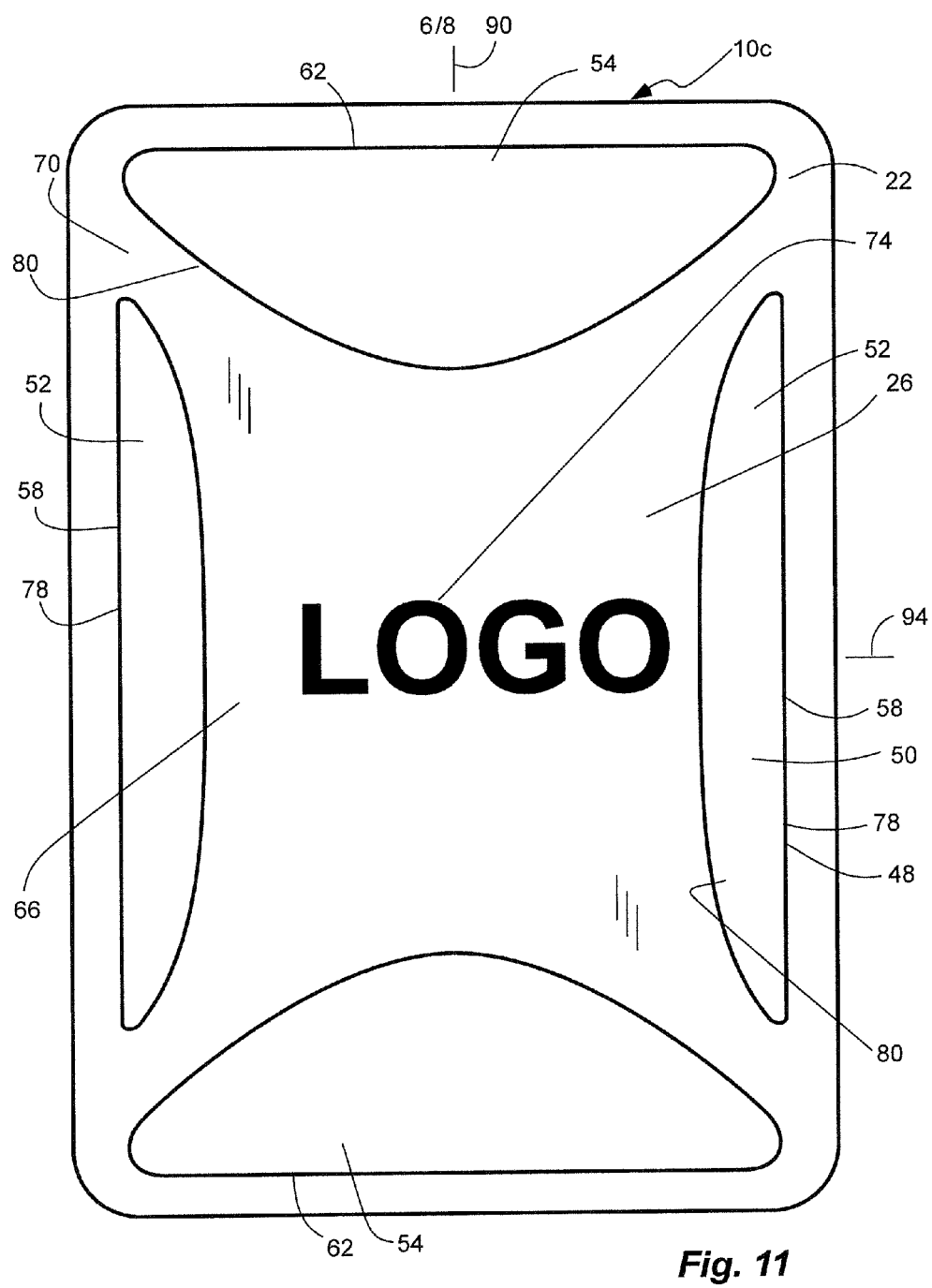
FIG. 11 is a back view of another universal case in accordance with an embodiment of the present invention, shown without a tablet computer, and in an original, unstretched, and/or relaxed configuration, and having a smaller size.
Figure 12:
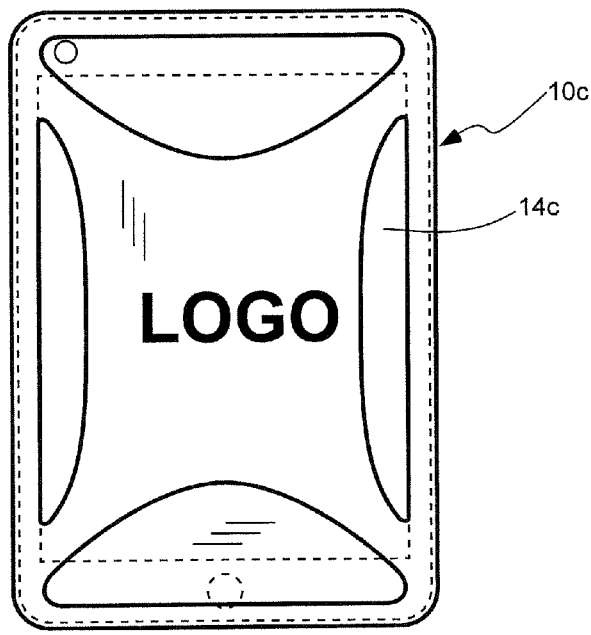
FIG. 12 is a back view of the universal case of FIG. 11, shown in a less stretched configuration with a smaller tablet computer therein, and having an intermediate size.
Figure 13:
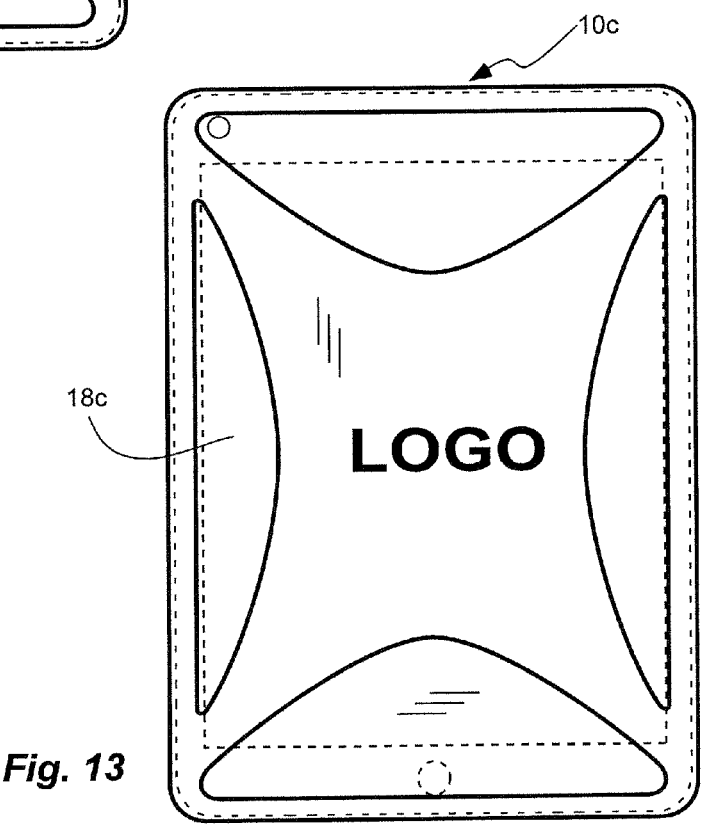
FIG. 13 is a back view of the universal case of FIG. 11, shown in a more stretched configuration with a larger tablet computer therein, and having a larger size.
Figure 14:
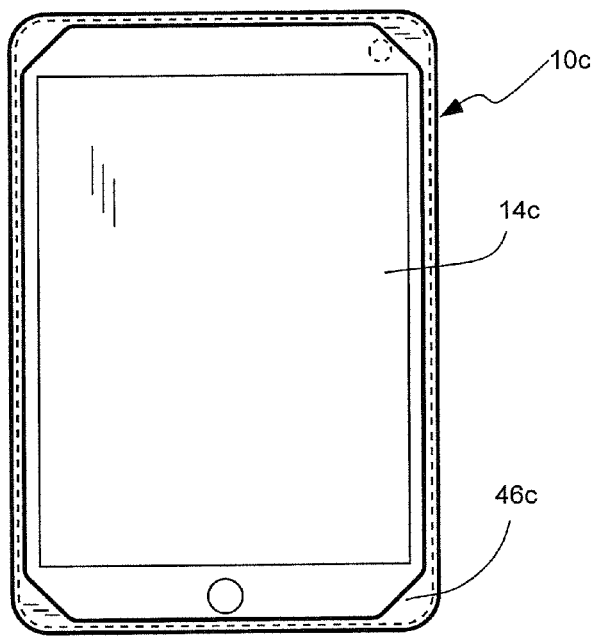
FIG. 14 is a front view of the universal case of FIG. 11, shown in a less stretched configuration with a smaller tablet computer therein, and having an intermediate size.
Figure 15:
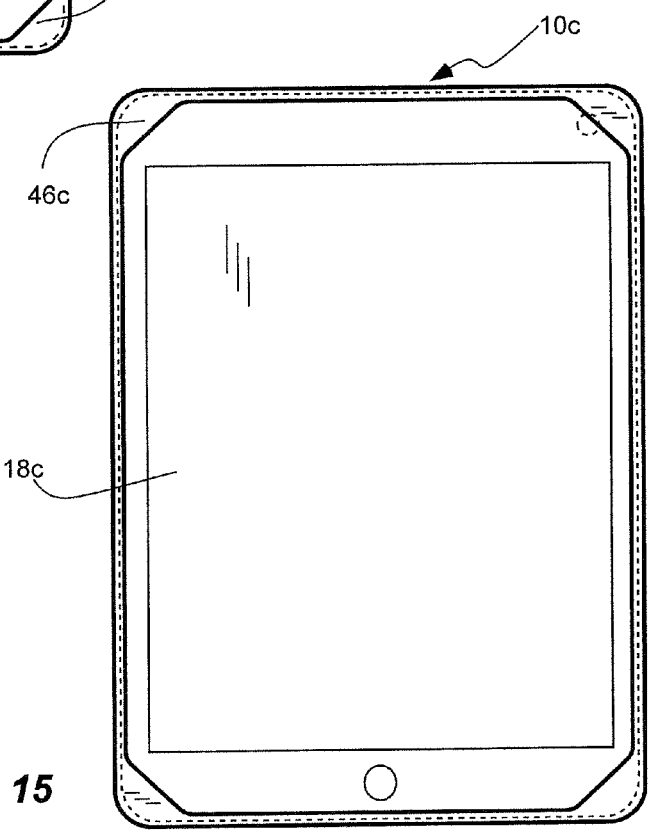
FIG. 15 is a front view of the universal case of FIG. 11, shown in a more stretched configuration with a larger tablet computer therein, and having a larger size.

Referring to FIG. 10, another universal case 10*b* is shown that is similar in most respects to that described above, and which description is hereby incorporated herein by reference. The case 10*b* or body 22*b* has a web 66*b* that is narrower and that can provide for greater stretching.

Referring to FIGS. 11-15, another universal case 10*c* is shown that is similar in most respects to that described above, and which description is hereby incorporated herein by reference. The case 10*b* or body 22*b* is sized and shaped to accommodate a tablet computer 14*c* or 18*c*. The case 10*c* can have three configurations, including: an original, unstretched, and/or relaxed configuration (FIG. 11) with a smaller size; a less stretched and smaller configuration (FIGS. 12 and 14) with an intermediate size and stretched over a smaller tablet 14*c*; and a more stretched and larger configuration (FIGS. 13 and 15) with a larger size stretched over a larger tablet computer 18c. The universal case 10c for a tablet computer 14c or 18c can be larger (or have a larger size in the original, unstretched or relaxed configuration) than the universal case 10 or 10b for a cellular phone 14 or 18 (in the original, unstretched or relaxed configuration).

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A universal case device configured for both a smaller mobile device and a larger mobile device, the case device comprising:
   a) a single, unitary, elastic body of flexible and resilient material, the body having a side wall extending around a perimeter of the body;
   b) the body having a front perimeter lip extending from the side wall around a majority of the perimeter of the body at a front of the body, and defining an aperture occupying a majority of the front of the body;
   c) the body having a rear perimeter lip extending from the side wall around a majority of a perimeter of the body at a rear of the body;
   d) the side wall, the front perimeter lip and the rear perimeter lip defining a perimeter channel configured to extend around a perimeter of both the larger and the smaller mobile devices when disposed therein;
   e) the body having a web with connections connected to the rear perimeter lip only adjacent corners of the body with the perimeter channel and rear perimeter lip being free of the web along a majority thereof;
   f) the side wall, the front perimeter lip, the rear perimeter lip and the web being integral with one another and formed together from the flexible and resilient material as the single, unitary, elastic body;
   g) the side wall, the front perimeter lip, the rear perimeter lip and the web defining a cavity to receive one of the mobile devices therein;
   h) the front perimeter lip having side and end lips at sides and ends, respectively, of the aperture, and having corner lips at corners of the aperture, the side and end lips having a narrower width extending inwardly from a perimeter of the body over the cavity, and the corner lips having a wider width extending inwardly from the perimeter of the body over the cavity to define corner pockets; and
   i) the body having at least two configurations including:
      i) a less stretched configuration in which the material of the body is less stretched and the body has a smaller width, height, or both, corresponding to the smaller mobile device and with the smaller mobile device disposed in the cavity; and
      ii) a more stretched configuration in which the material of the body is more stretched and the body has a larger width, height, or both, corresponding to the larger mobile device and with the larger mobile device disposed in the cavity.

2. The device in accordance with claim 1, further comprising:
   a) the perimeter channel having a pair of side channels on opposite sides of the body and facing inwardly to the cavity and receiving lateral sides of one of the mobile devices when disposed in the cavity; and
   c) a pair of grooves each disposed in a different one of the pair of side channels, with each groove extending into an inner surface of the side wall.

3. The device in accordance with claim 1, wherein the body has at least three configurations including an unstretched configuration in which the body is removed from both the larger and smaller mobile device.

4. The device in accordance with claim 3, wherein the width, the height, or both of the body is stretched at least 104% in the less stretched configuration; and wherein the width, the height, or both of the body is stretched at least 107% in the more stretched configuration.

5. The device in accordance with claim 1, wherein the width, the height, or both of the body stretches at least 107%.

6. The device in accordance with claim 1, wherein the flexible and resilient material of the body comprises silicone cured at a temperature between approximately 35-45 degrees Celsius.

7. The device in accordance with claim 1, wherein lateral sides of the body are symmetrical about a longitudinal axis; and wherein longitudinal ends of the body are symmetrical about a lateral axis.

8. The device in accordance with claim 1, wherein the web has concave arcuate sides and ends opposing the rear perimeter lip.

9. The device in accordance with claim 1, further comprising:
   indicia disposed on an outward facing surface of the web, the indicia being indicative of or representing a business, a product, or both.

10. A method of using the universal case device in accordance with claim 1, the method comprising:
    a) removably inserting the smaller mobile device into the cavity and stretching the front perimeter lip over a front of the smaller mobile device;
    b) removing the smaller mobile device from the cavity;
    c) removably inserting the larger mobile device into the cavity and stretching the front perimeter lip over a front wall of the larger mobile device; and
    d) removing the larger mobile device from the cavity.

11. A method of using the universal case device in accordance with claim 1, the method comprising:
    a) removably inserting one of the mobile devices into the cavity; and
    b) removably inserting a finger, a card, currency, or an identification or license card between the web and a back of the one of the mobile devices.

12. A universal case device configured for both a smaller mobile device and a larger mobile device, the case device comprising:
    a) a single, unitary, elastic body of flexible and resilient material, the body having a side wall extending around a perimeter of the body;
    b) the body having a front perimeter lip extending from the side wall around a majority of the perimeter of the body at a front of the body, and defining an aperture occupying a majority of the front of the body;
    c) the body having a rear perimeter lip extending from the side wall around a majority of a perimeter of the body at a rear of the body;
    d) the side wall, the front perimeter lip and the rear perimeter lip defining a perimeter channel configured to extend around a perimeter of both the larger and the smaller mobile devices when disposed therein;

e) the body having a web with connections connected to the rear perimeter lip only adjacent corners of the body with the perimeter channel and rear perimeter lip being free of the web along a majority thereof;

f) the side wall, the front perimeter lip, the rear perimeter lip and the web being integral with one another and formed together from the flexible and resilient material as the single, unitary, elastic body;

g) the side wall, the front perimeter lip, the rear perimeter lip and the web defining a cavity to receive one of the mobile devices therein;

h) the front perimeter lip having side and end lips at sides and ends, respectively, of the aperture, and having corner lips at corners of the aperture, the side and end lips having a narrower width extending inwardly from a perimeter of the body over the cavity, and the corner lips having a wider width extending inwardly from the perimeter of the body over the cavity to define corner pockets;

i) the body having at least two configurations including:
  i) a less stretched configuration in which the material of the body is less stretched and the body has a smaller width, height, or both, corresponding to the smaller mobile device and with the smaller mobile device disposed in the cavity; and
  ii) a more stretched configuration in which the material of the body is more stretched and the body has a larger width, height, or both, corresponding to the larger mobile device and with the larger mobile device disposed in the cavity;

i) the perimeter channel having a pair of side channels on opposite sides of the body and facing inwardly to the cavity and receiving lateral sides of one of the mobile devices when disposed in the cavity; and j) a pair of grooves each disposed in a different one of the pair of side channels, with each groove extending into an inner surface of the side wall.

13. The device in accordance with claim 12, wherein the body has at least three configurations including an unstretched configuration in which the body is removed from both the larger and smaller mobile devices.

14. The device in accordance with claim 13, wherein the width, the height, or both of the body is stretched at least 104% in the less stretched configuration; and wherein the width, the height, or both of the body is stretched at least 107% in the more stretched configuration.

15. The device in accordance with claim 12, wherein the width, the height, or both of the body stretches at least 107%.

16. The device in accordance with claim 12, wherein the flexible and resilient material of the body comprises silicone cured at a temperature between approximately 35-45 degrees Celsius.

17. A universal case device in combination with a smaller mobile device and a larger mobile device with one of the mobile devices selectively coupled to the universal case device, the smaller mobile device having a smaller width, length, or both, than the larger mobile device, and the larger mobile device having a larger width, length, or both, than the smaller mobile device, the case device comprising:

a) a single, unitary, elastic body of flexible and resilient material, the body having a side wall extending around a perimeter of the body;

b) the body having a front perimeter lip extending from the side wall around a majority of the perimeter of the body at a front of the body, and defining an aperture occupying a majority of the front of the body;

c) the body having a rear perimeter lip extending from the side wall around a majority of a perimeter of the body at a rear of the body;

d) the side wall, the front perimeter lip and the rear perimeter lip defining a perimeter channel configured to extend around a perimeter of both the larger and the smaller mobile devices when disposed therein;

e) the body having a web with connections connected to the rear perimeter lip only adjacent corners of the body with the perimeter channel and rear perimeter lip being free of the web along a majority thereof;

f) the side wall, the front perimeter lip, the rear perimeter lip and the web being integral with one another and formed together from the flexible and resilient material as the single, unitary, elastic body;

g) the side wall, the front perimeter lip, the rear perimeter lip and the web defining a cavity to receive one of the mobile devices therein;

h) the front perimeter lip having side and end lips at sides and ends, respectively, of the aperture, and having corner lips at corners of the aperture, the side and end lips having a narrower width extending inwardly from a perimeter of the body over the cavity, and the corner lips having a wider width extending inwardly from the perimeter of the body over the cavity to define corner pockets;

h) the body having at least three configurations including:
  i) a less stretched configuration in which the material of the body is less stretched and the body has a smaller width, height, or both, corresponding to the smaller mobile device and with the smaller mobile device disposed in the cavity; and
  ii) a more stretched configuration in which the material of the body is more stretched and the body has a larger width, height, or both, corresponding to the larger mobile device and with the larger mobile device disposed in the cavity; and
  iii) an unstretched configuration in which the body is removed from both the larger and smaller mobile devices;

i) the perimeter channel having a pair of side channels on opposite sides of the body and facing inwardly to the cavity and receiving lateral sides of one of the mobile devices when disposed in the cavity;

j) a pair of grooves each in a different one of the pair of side channels, with each groove extending into an inner surface of the side wall; and k) the width, the height, or both of the body stretches at least 107%.

18. The combination in accordance with claim 17, wherein the flexible and resilient material of the body comprises silicone cured at a temperature of approximately 35-45 degrees Celsius.

19. The combination in accordance with claim 17, further comprising:

indicia disposed on an outward facing surface of the web, the indicia being indicative of or representing a business, a product, or both.

20. A method of using the universal case device in accordance with claim 17, the method comprising:

a) removably inserting the smaller mobile device into the cavity of the body and stretching the perimeter lip of the front wall over a front of the smaller mobile device;

b) removing the smaller mobile device from the cavity of the body;

c) removably inserting the larger mobile device into the cavity of the body and stretching the perimeter lip of the front wall over a front wall of the larger mobile device; and
d) removing the larger mobile device from the cavity of the body.

21. A method of using the universal case device in accordance with claim 17, the method comprising:
a) removably inserting one of the mobile devices into the cavity of the body; and
b) removably inserting a finger, a card, currency, or an identification or license card through one of the pair of side slots in the back wall and between the web and a back of the one of the mobile devices.

* * * * *